UNITED STATES PATENT OFFICE.

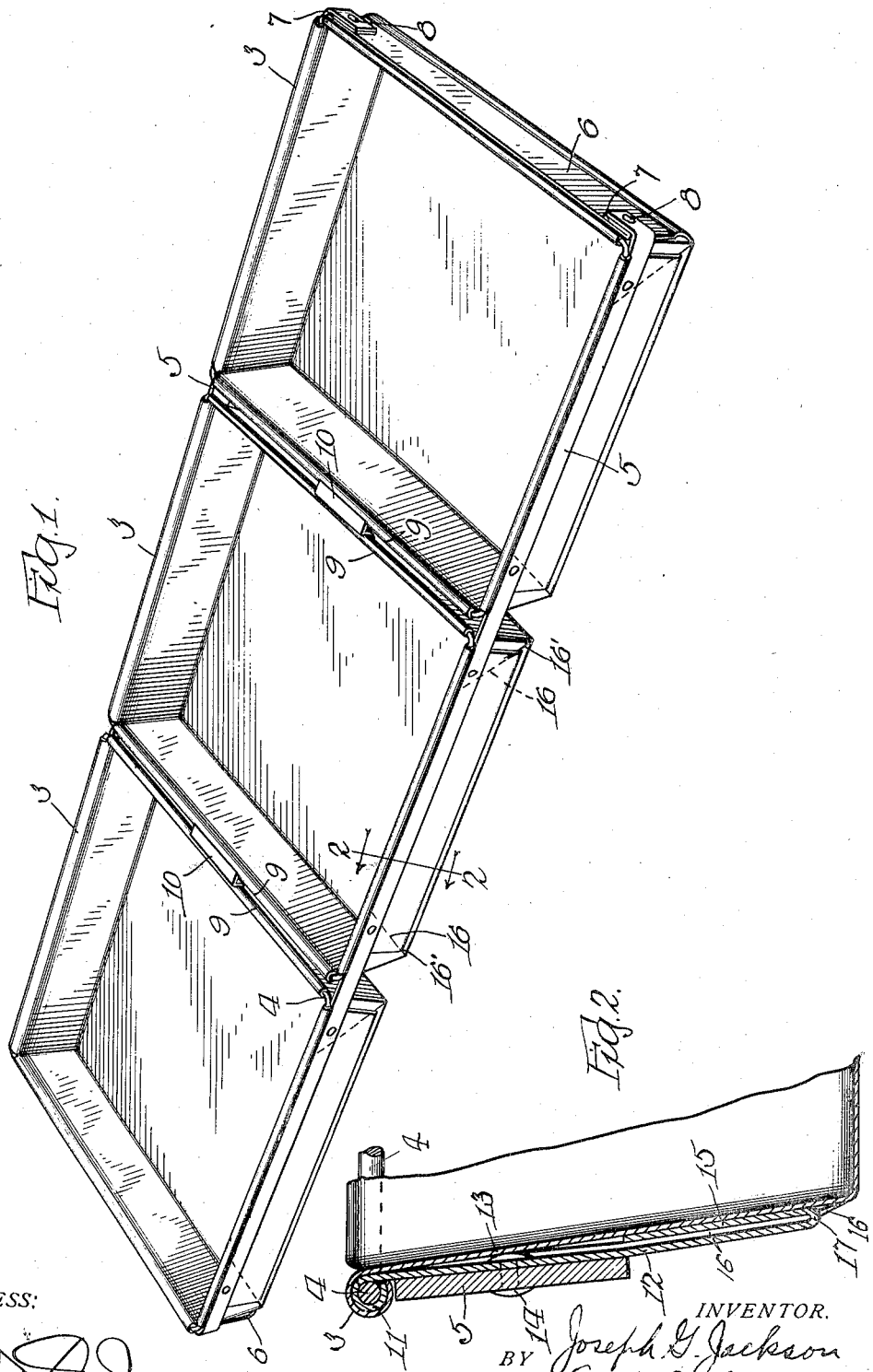

JOSEPH GEORGE JACKSON, OF CHICAGO, ILLINOIS, ASSIGNOR TO EDWARD KATZINGER COMPANY, OF CHICAGO, ILLINOIS, A CORPORATION OF ILLINOIS.

BAKING-PAN.

1,302,664.     Specification of Letters Patent.     Patented May 6, 1919.

Application filed April 26, 1918. Serial No. 230,870.

*To all whom it may concern:*

Be it known that I, JOSEPH GEORGE JACKSON, a citizen of the United States, residing at Chicago, in the county of Cook and State of Illinois, have invented certain new and useful Improvements in Baking-Pans, of which the following is a specification.

My invention relates to multiple baking pans such as used in bake shops, and the like, and the object of this improvement is the provision of a simple and efficient baking pan construction of the character mentioned.

A further object is the production of a baking pan of the character mentioned which is easily kept clean, and which is durable. Other objects will appear hereinafter.

An embodiment of my invention is shown in the accompanying drawing, forming a part of this specification, and in which—

Figure 1 is a perspective view of a multiple baking pan embodying my invention; and Fig. 2 is an enlarged section taken on line 2—2 of Fig. 1.

I have shown, in the drawing, a multiple pan set made up of three individual pans, but it will be apparent that any number of pans may be included in a set by changing the size of the frame to suit the required number of pans. It will also be apparent that the sizes and shapes of the pans may be varied and the frame made to fit the desired pans.

Referring more particularly to the drawing, I have indicated three pans 3 which may be of any conventional construction. The pans 3 shown are each provided with a wire frame 4 turned in around the tops of the wall material in the usual manner forming a conventional wired rim, well known in the art. Around the pans 3 I provide a frame made up of side bars 5 and end plates 6. The end plates 6 are each preferably provided with an ear 7 at each end near its upper corners, turned back on the outer side thereof, and the side bars 5 have their ends bent over on the ears 7, as clearly indicated in Fig. 1. The ears 7 and ends of the bars 5 are secured together in a suitable manner, such as by rivets 8. The top edges of the frame 5—6 preferably rest close up under the lower edges of the wired rims of the pans.

Between the adjacent pan rims 9 I provide spacing members 10. One or more of these spacing members may be provided between each pair of adjacent rims 9, as desired. The form of spacing member provided to effectively brace the rims 9 and hold them in their relative positions is substantially the same as that shown in United States Patent No. 1,200,849 issued to Edward Katzinger on October 10, 1916. The members 10 are preferably of such sizes that they will not materially interfere with the circulation of heat between the pans, and also of such sizes that the remote sides of the outer pans are against the inner sides of the plates 6.

The pans 3 are each secured to the side bars 5 by means of the two plates or securing members. These securing members each have one edge 11 turned around a wire 4 of one of the pans 3 under the side material of such pan, as clearly indicated in Fig. 2. The intermediate portion 12 is disposed between the end wall 13 of the pan and a side bar 5. The intermediate portion 12 is secured to the side bar in a suitable manner, such as by two or more rivets 14. In order to strengthen the connection between the securing members and the pan 3, I preferably bend up the other end portion 15 of the securing member behind the intermediate portion 12 against the wall 13 of the pan, as clearly indicated in Fig. 2. Each of the pans 3 is formed in the usual manner with a portion 16 of the wall material folded up on the ends 13 of the pans. The securing member is preferably of a width so that the bent portion 17 between the parts 12 and 15 will rest against the adjacent corners 16' of the folded wall material 16. Thus the parts 12 and 15 of the securing members are locked securely against the folded parts 16 on the pan ends giving a very rigid connection between the securing member and the pan.

While I have illustrated and described the preferred form of my invention, I do not desire to be limited to the precise details set forth, but desire to avail myself of such variations and changes as come within the scope of the appended claims.

I claim:—

1. A multiple baking pan comprising a plurality of pans having wires turned in around their rims; a frame extending around all of said pans; and a member at each end of each of said pans, each member having one edge portion turned in between the wire and wall material of an end of one of said pans, its intermediate portion disposed between a pan end and said frame and secured to the latter and its other edge portion folded up between said intermediate portion and the adjacent pan end.

2. A multiple baking pan comprising a plurality of pans having wires turned in around their rims and portions of the pan wall folded up on the pan ends; a frame extended around all of said pans; a member at each end of each of said pans, each member having one edge portion turned in between the wire and wall material at one end of said pans and its other edge portion extending up under said portions of the pan wall material which is folded on the ends of the pans; and means securing said frame to said members.

3. A multiple baking pan comprising a plurality of pans having wires turned in around their rims and portions of the pan wall material folded in triangular form against the pan ends; a frame disposed around all of the pans; a member at each end of each of said pans, each member having its upper edge portion turned in between the wire and wall material of the end of one of said pans and its lower edge portion folded up between the triangular folded wall material at said pan end and such pan end; and means securing said members to said frame.

4. A multiple baking pan comprising a plurality of pans having wires turned in around their rims and portions of the pan wall material folded in triangular form against the pan ends; a frame disposed around all of the pans; a member at each end of each of said pans, each member having its upper edge portion turned in between the wire and wall material of the end of one of said pans and its lower edge portion folded up between the triangular folded wall material at said pan end and such pan end, the lateral edges of said members where the latter is folded near its lower edge being in engagement with adjacent edges of the wall material folded on said pan ends; and means securing said members to said frame.

5. A multiple baking pan comprising a plurality of pans having wires turned in around their rims and portions of the pan wall material folded in triangular form against the ends of the pans; a member at each end of each of said pans, each member having its upper edge portion turned in between the wire and wall material of the end of one of said pans, its intermediate portion disposed on said pan end over the folded wall material portions on such pan end and its lower edge portions folded up under said triangular wall material portions; a frame extending around all of said pans close up under said wire rims and on the outer sides of said members; and rivets securing said frame to said members.

6. A multiple baking pan comprising a plurality of pans having wires turned in around their rims; bars disposed along the ends of said pans; and a member at each end of each of said pans, each member having one edge portion turned in between the wire and wall material of an end of one of said pans, its intermediate portion disposed between a pan end and said frame and secured to the latter and its other edge portion folded up betwen said intermediate portion and the adjacent pan end.

7. A multiple baking pan comprising a plurality of pans having wired rims and portions of the pan material folded against the outer sides of the pan ends; bars disposed at the ends of said pans; and members attached to said bars, each member having a portion disposed in an adjacent pan rim and a portion disposed between said pan end and the folded pan wall material on such end.

8. A multiple baking pan comprising a plurality of pans having wired rims and portions of the pan wall material folded in trinagular form against the pan ends; bars extending along the pan ends adjacent said wired rims; and plates attached to the bars, each plate having a portion secured in an adjacent wired rim and a portion extending upwardly between the adjacent pan end and the wall material folded on said pan end.

In testimony whereof I have signed my name to this specification on this 20th day of April A. D. 1918.

JOSEPH GEORGE JACKSON.